US008666402B2

(12) United States Patent
Zhu

(10) Patent No.: US 8,666,402 B2
(45) Date of Patent: Mar. 4, 2014

(54) METHOD FOR TRIGGERING USER REGISTRATION IN IP MULTIMEDIA SUBSYSTEM

(75) Inventor: Fenqin Zhu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1091 days.

(21) Appl. No.: 11/938,926

(22) Filed: Nov. 13, 2007

(65) Prior Publication Data

US 2008/0064398 A1    Mar. 13, 2008

Related U.S. Application Data

(63) Continuation of application No. PCT/CN2006/001971, filed on Aug. 4, 2006.

(30) Foreign Application Priority Data

Aug. 30, 2005   (CN) .......................... 2005 1 0036979

(51) Int. Cl.
*H04W 4/00*   (2009.01)
*H04W 36/00*   (2009.01)
*H04B 7/00*   (2006.01)
*H04L 12/66*   (2006.01)

(52) U.S. Cl.
USPC ....... 455/435.1; 455/436; 455/41.2; 455/466; 370/331; 370/352

(58) Field of Classification Search
USPC ........... 455/435.1, 466, 436–444, 432.1–445, 455/41.2, 414.1–414.4, 418–420, 448–449, 455/550.1–553.1; 370/331, 352–356
See application file for complete search history.

(56) References Cited

U.S. PATENT DOCUMENTS

2003/0119506 A1   6/2003   Singhai et al.
2004/0122934 A1   6/2004   Westman et al.
(Continued)

FOREIGN PATENT DOCUMENTS

CN   02/32084 A2   4/2002
CN   1507762 A   6/2004
(Continued)

OTHER PUBLICATIONS

3GPP TSG SA WG2 Architecture: "IMS Registration Trigger", S2-052159, Sep. 9, 2005, pp. 1-2, XP002500626.
(Continued)

*Primary Examiner* — Vladimir Magloire
*Assistant Examiner* — Michael Mapa
(74) *Attorney, Agent, or Firm* — Slater & Matsil, L.L.P.

(57) ABSTRACT

A method for triggering an IMS (IP Multimedia Subsystem) registration in the IMS, includes sending, by network side or a user who initiates the triggering, an IMS registration triggering indication message to a user who needs the IMS registration, to prompt the user who needs the IMS registration to initiate the IMS registration to the IMS; according to the IMS registration triggering indication message, trigging the user who needs the IMS registration to initiate the IMS registration to the IMS. Since the network side or the user who initiates the triggering triggers the IMS registration for the user who needs the IMS registration, the problem that the SIP messages may not be issued to the user who needs the IMS registration and the IMS session may not be performed because the user who needs the IMS registration does not register in the IMS during the IMS session, can be avoided.

13 Claims, 2 Drawing Sheets

(56) References Cited

U.S. PATENT DOCUMENTS

| | | | |
|---|---|---|---|
| 2004/0146040 A1 | 7/2004 | Phan-Anh et al. | |
| 2005/0009520 A1* | 1/2005 | Herrero et al. | 455/435.1 |
| 2005/0202819 A1* | 9/2005 | Blicker | 455/435.1 |
| 2005/0239445 A1* | 10/2005 | Karaoguz et al. | 455/414.1 |
| 2005/0266869 A1* | 12/2005 | Jung | 455/518 |
| 2007/0097879 A1* | 5/2007 | Bleckert et al. | 370/254 |
| 2010/0120425 A1 | 5/2010 | Bajko | |

FOREIGN PATENT DOCUMENTS

| | | |
|---|---|---|
| CN | 1642130 | 7/2005 |
| CN | 1650656 A | 8/2005 |
| CN | 1767482 | 5/2006 |
| WO | 02/091786 A1 | 11/2002 |
| WO | WO02/102107 | 12/2002 |
| WO | 2005/039108 A2 | 4/2005 |

OTHER PUBLICATIONS

European Search Report-dated Oct. 31, 2008; Application No./Patent No. 06775291.5—1244 / 1921795 PCT/CN2006001971.

Written Opinion of the International Searching Authority PCT/CN2006/001971.

3GPP TR 23.976 v6.1.0 (Jun. 2004) Technical Report: "$3^{rd}$ Generation Partnership Project: Technical Specification Group Services and System Aspects Push architecture (Release 6)", Jun. 2004.

3rd Generation Partnership Project; "Technical Specification Group Services and Systems Aspects Push architecture," Release 6, 3GPP TR 23.976 V6.1.0, Jun. 2004, 9 pages.

First Chinese Office Action, Chinese Application No. 200680012309.6, Mailing Date: Jan. 9, 2009, 22 pages.

* cited by examiner

METHOD FOR TRIGGERING USER REGISTRATION IN IP MULTIMEDIA SUBSYSTEM

The present application is a continuation of PCT application PCT/CN2006/001971, filed on Aug. 4, 2006, entitled "A METHOD OF REALIZING USER REGISTRATION TRIGGER IN IP MULTIMEDIA SUBSYSTEM", which is incorporated by reference herein in its entirety.

FIELD OF THE INVENTION

The present invention relates to the communication technology, particularly to a method for triggering a user registration in IMS (IP multimedia subsystem).

BACKGROUND OF THE INVENTION

As mobile communication technology develops, traditional voice communication services can not satisfy communication demand, and people have urgent demand for experiencing new multimedia services. The multimedia services include not only simple audio and video communication services but also instant messaging, stream media services, etc., especially services that combine new communication manner and traditional voice communication.

As the trend of combination of Internet and telecom networks, 3GPP (The 3rd Generation Partnership Project) has introduced the IMS (IP Multimedia Subsystem) of full IP service network architecture which supports multimedia services based on the Packet Bearer Network. The IMS depends on customized user data to keep independent of user access modes, to control openness of service capability, and to provide new multimedia communication experience.

FIG. 1 is a schematic diagram of the IMS entities and interfaces defined by 3GPP. The main function entities in IMS are CSCF (Call Session Control Function) and HSS (Home User Server).

CSCF are in three types: S-CSCF (Serving-Call Session Control Function), P-CSCF (Proxy-Call Session Control Function), and I-CSCF (Interrogating-Call Session Control Function). The P-CSCF is the first contact point for UE (User Equipment) in the IMS. The P-CSCF performs Proxy function, receives SIP (Session Initiation Protocol) messages and performs corresponding process, then forwards it. The I-CSCF is mainly designed to interrogate and to perform functions of network topology hiding. When the user registers, the I-CSCF queries from the HSS and determines the S-CSCF which serving for the user. The S-CSCF records the call state of the user and performs call control function. The S-CSCF is the main service control entity. Different S-CSCFs may perform different service functions by connecting different ASes (application servers).

The HSS stores user information and service data for each IMS user, and communicates with the CSCFs to perform routing function and roaming function; meanwhile, the HSS provides authentication, authorization, IMSI/IP address mapping, locating function, etc. The user information includes: user number and address information, security information for authentication and authorization, location information for supporting the user to register, user locations information in different systems and user profile etc. The service data includes service triggering rules, service triggering logic, etc.

SUMMARY OF THE INVENTION

An embodiment of the present invention provides a method for triggering user IMS (IP multimedia subsystem) registration in IMS, so as to trigger a user who needs the IMS registration to accomplish the IMS registration.

According to an embodiment of the present invention, a method for triggering IMS (IP Multimedia Subsystem) registration in IMS, including:

receiving, by a user who needs the IMS registration, an IMS registration triggering indication message from a network side or a user who initiates a triggering; and triggering the user who needs the IMS registration to initiate the IMS registration to the IMS according to the IMS registration triggering indication message.

A system for triggering IMS (IP Multimedia Subsystem) registration in IMS, including:

a receiving unit, adapted to receive an IMS registration triggering indication message from a network side or a user who initiates a triggering; and a triggering unit, adapted to trigger a user who needs the IMS registration to initiate the IMS registration to the IMS according to the IMS registration triggering indication message.

In an embodiment of the present invention, the network side or the user who initiates the triggering, sends the IMS registration triggering indication message to the user who needs do IMS registration, to indicate the user who needs the IMS registration to initiate the IMS registration to the IMS; when the user who needs the IMS registration receives the IMS registration triggering indication message, the user determines whether to initiate the IMS registration to the IMS after performing a judgment according to the IMS registration triggering indication message. Since the network side or the user who initiates the triggering indication, triggers the IMS registration for a called user, the problem that the SIP request may not be issued to the user and therefore the IMS session can not be performed because the user who needs IMS registration does not register in the IMS during the IMS session, may be avoided.

DETAILED DESCRIPTION OF THE EMBODIMENTS

In the embodiments of the present invention, during initiating an IMS (IP multimedia subsystem) session, when a user is not registered in the IMS or is uncertain about whether a user at opposite end is registered in the IMS, and the IMS session may be performed, the network or the user who initiates the triggering indication sends an IMS registration triggering indication message to the user who needs the IMS registration, to indicate the user who needs the IMS registration to initiate the IMS registration to the IMS; and according to the IMS registration triggering indication message, the user who needs the IMS registration is triggered to initiate the IMS registration to the IMS after a judgment.

During the implementation, after the user who needs the IMS registration receives the triggering indication message, the user may perform a judgment to determine whether to initiate the IMS registration; if the result of the judgment is to initiate the IMS registration, the IMS registration is initiated; otherwise the IMS registration is not initiated. When the method mentioned above is applied in a session (the session may be a non-IMS domain session or an IMS domain session), the user who initiates the triggering may be a calling user, while the user who needs the IMS registration may be a called user. The method provided in an embodiment of the present invention will be described in detail as below.

According to an embodiment of the present invention, if the network side initiates the IMS registration for activating the called user, an IMS triggering indication message may be sent by push manner; and if the IMS registration for activating the called user initiates by the calling user (an non-IMS session exists between the calling user and the called user), the IMS triggering indication message may be sent by an signaling interacting between the calling user and the called user, or by an short message interacting between the calling user and the called user. If the IMS triggering indication message is sent by a signaling, the signaling may be, for example, UUS (User-to-User Signaling) signaling, or signaling obtained by extending existing signaling.

Figure 1:
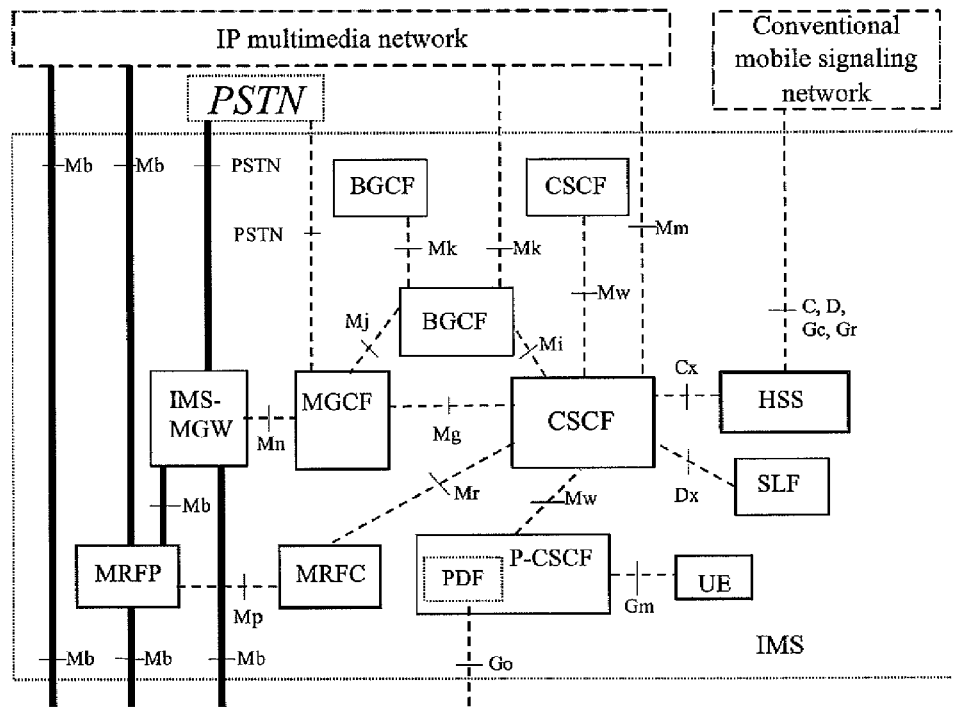
FIG. 1 is a schematic diagram of an IMS system in the related art.
Figure 2:
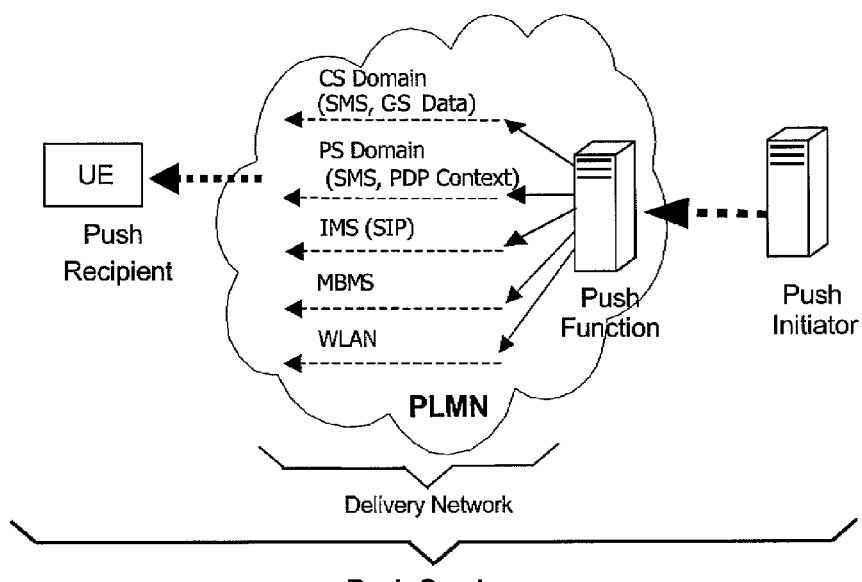
FIG. 2 is a diagram showing the principal of message push manner from network side in the related art.

An embodiment in which the IMS registration triggering indication message is sent by the push manner is described as below:

First, the principle of the push manner is described with reference to FIG. 2. As shown in FIG. 2, a PUSH manner for messages in the network side is defined in 3GPP 23.976. The PUSH Initiator is a content source; if there is a message in the network side to be sent to an UE (User Equipment), the message is sent to the UE via a PF (Push Function) entity. The messages may be sent by different transmission manner. If the transmission network is a CS (Circuit Switching) domain, PS (Packet Switching) domain, or IMS domain, the transmission manner may be SMS (short message service) or USSD (Unstructured Supplementary Service Data), etc. The PF may select an appropriate transmission manner by a certain algorithm, and send the message to the PUSH Recipient. The message can display the message to the user.

Figure 3:
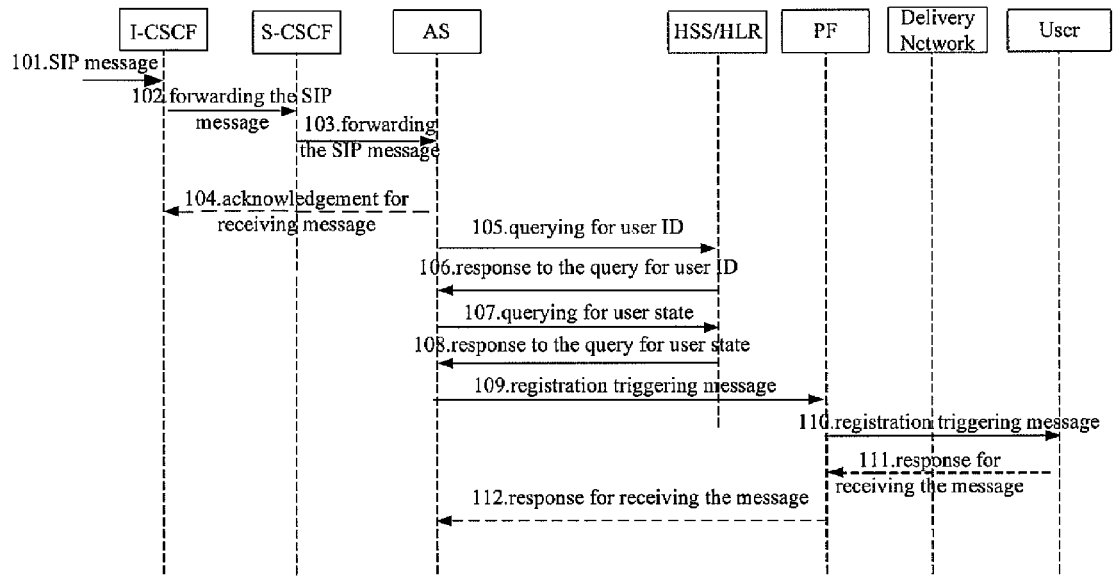
FIG. 3 is a flow chart showing a method for transmitting IMS registration triggering indication message by push manner according to an embodiment of the present invention.

The PUSH manner can use to push a message from the network side to a user. In an embodiment of the present invention, the IMS registration triggering indication message may be sent to the user as the PUSH content by the PUSH manner. FIG. 3 is a flow chart showing a method for transmitting the IMS registration triggering indication message by push manner according to an embodiment of the present invention.

Step 101: the I-CSCF (Interrogating-Call Session Control Function) in the IMS network of the called user receives a SIP (Session Initiation Protocol) message.

Step 102: the I-CSCF queries in HSS (Home User Server) and detects the user is not registered in the IMS and the user subscribes for unregistered IMS service; the I-CSCF selects an S-CSCF (Serving-Call Session Control Function) and forwards the SIP message to the S-CSCF.

Step 103: the S-CSCF forwards the SIP message to an AS (application server) in accordance with the iFC (initial filter criteria) rules.

Step 104: the AS determines processing for the received SIP message according to the predetermined operation logic, and the AS may return a response to the source end optionally.

Step 105: as the called user is not registered in the IMS, the AS determines whether to trigger the called user to register in the IMS according to the subscription data; if the AS determines to trigger the called user to register, the AS triggers the IMS registration for the called user; otherwise the AS does not trigger the IMS registration for the called user. In the implementation, this step may be combined with step 107.

Because the public user ID in IMS domain of the user, such as IMPU (IP Multimedia Public Identity), is different from the public user ID in non-IMS domain, such as MSISDN (Mobile Station International ISDN number), so as the AS initiates triggering of IMS registration for the called user, the AS may not directly use the ID in IMS domain, such as IMPU, as the user ID to push the IMS registration triggering indication message; while the AS needs to convert the ID in IMS domain into the public user ID in the domain to be pushed, such as MSISDN or IMSI (International Mobile User Identity). The AS determines whether the public user ID in the domain to be pushed i.e. MSISDN or IMSI, can be obtained from the SIP message directly. If the public user ID in the domain to be pushed to the called user can be deduced from the IMS session message, such as there is a mapping between TEL URI (Telephone Uniform Resource Identifier) and MSISDN. The AS may obtain the MSISDN of the user by the TEL URI. Then this method may proceed to step 107 directly without step 105.

If the AS can not deduce the mapping, the AS needs to query for the mapping in a network entity i.e. HSS (Home Subscriber Server), and the network entity stores the mapping between public user ID in IMS domain and public user ID in non-IMS domain.

Step 106: the network entity which stores the mapping between public user IDs in IMS domain and public user IDs in non-IMS domain (i.e. HSS or HLR (Home Location Register)), returns a query response to the AS; according to the query response, the AS may obtain the public user ID in the domain to be pushed.

As an ID in IMS domain (i.e. IMPU) may correspond to more than one public user IDs in the domain to be pushed (i.e. MSISDN or IMSI), the number of the returned public user ID (i.e. MSISDN or IMSI) in the domain to be pushed may more than one. Therefore, the AS needs to select one or several public user ID(s) (i.e. MSISDNs or IMSIs) in the domain to be pushed according to a certain criteria.

If the AS is unable to select a corresponding public user ID (i.e. MSISDN) in the domain to be pushed according to the ID in IMS domain (i.e. IMPU), the AS is not to perform subsequent process.

If the AS finds that the ID in IMS domain (i.e. IMPU) is corresponding to many public user IDs in the domain to be pushed (i.e. MSISDN of the user in CS (circuit switching) or PS (packet switching) network, or ISDN number of the user in PSTN network), and the AS is unable to select an appropriate public user ID in the domain to be pushed (i.e. MSISDN) by the certain criteria, then the AS may inform the calling user that it is unable to select the public user ID in the domain to be pushed. Therefore, if the public user ID of the called user in the domain to be pushed is got, a subsequent SIP message may be within the public user ID information in the domain to be pushed of the called user.

Step 107-108: the AS can determine whether it is necessary to send the IMS registration triggering indication message to the UE. If AS determines that it is unnecessary to send the IMS registration triggering indication message, the process of the method of this embodiment ends. Otherwise, the AS continues with subsequent process.

The determination criteria for the AS may include: wireless environment that the UE is located, capability information of the UE, whether the user is roaming, etc. For example, if the AS determines that the wireless environment permits to send the IMS registration triggering indication message or the UE supports PS domain, or both of the above conditions are satisfied, then the AS determines that the IMS registration triggering indication message may be sent to the UE. In addition, the determination criteria may also be preconfigured by a service provider. For example, the determination criteria preconfigured by service provider may be: the registration shall always be triggered for non-roaming users, and otherwise the registration shall not be triggered. The determination criteria and configuration mentioned above may be adjusted and combined by the service provider service provider as according to requirement of actual operations.

The process that the AS determines whether to send the IMS registration triggering indication message to the UE may be combined with the process that the AS determines whether to send the registration triggering message in accordance with the subscription data in the step 105, or may be performed individually.

The judgment may also be performed before the conversion from the public user ID in IMS domain (i.e. IMPU) to the public user ID in the domain to be pushed (i.e. MSISDN).

If the AS determines to send the IMS registration triggering indication message to the user triggered by the IMS registration, the AS also needs to select a manner for sending the IMS registration triggering indication message.

The AS selects a transmission mode mainly according to the real-time state information and the policy of the user or the network. The real-time state information may comprising by one or more of the following information at least:

(A) State of the user in the domain to be pushed. The AS may query the state of the user in CS or PS domain in the HSS or the HLR according to the public user ID of the user (i.e. MSISDN) in the domain to be pushed. In other words, the AS detects whether the user has registered in the domain to be pushed (i.e. the CS or PS domain), and the HSS or the HLR returns the query response to the AS.

(B) Capability information of the UE. The AS obtains the capability information of the UE from a DM (Device Management) server.

(C) Current state of the network, i.e., whether the network is congested.

The AS selects the transmission mode according to the state information mentioned above and the policy of the user or the network.

The process for determining the transmission mode according to state information and the policy of the user or the network may be performed flexibly. All of the above factors can be used to determine the transmission mode. Wherein only one or more of the above factors can also be used to determine the transmission mode.

The AS may also transmit the registration triggering message to the PF without the transmission mode selection process. Then the PF will select the transmission mode.

In actual application, the three processes, i.e., the process of determining whether to push the registration triggering message by the AS, the process of querying the user public ID in the domain to be pushed, and the process of selecting the transmission mode, may be combined. For example, the AS subscribes Presence information of the called user through Presence server. During the above process, the AS according to some preconfigured policies to determine whether to push the registration triggering message, and to obtain the user public ID in the domain to be pushed and the transmission mode Step 109: the AS sends the selected transmission mode, the public user ID of the called user in the domain to be pushed (i.e. MSISDN), and the IMS registration triggering indication message to the PF. In the embodiments of the present invention, if the AS does not determine the transmission mode in steps 107-108, then the PF needs to select the transmission mode.

The PF determines whether to return an IMS registration triggering response message to the AS, according to the information whether the interface message between the AS and the PF needs an acknowledgement to transmit. For example, if it is a reliable transmission (an acknowledgement needs to transmit), then the PF will return a response message to the AS in step 112.

Step 110: the PF determines the transmission mode, and pushes the IMS registration triggering indication message to the user.

Step 111: the UE receives the IMS registration trigger indication message, and determines whether to return a response message according to the information whether the reliable transmission is required.

In an embodiment of the present invention, the PF and the AS may be combined as an entity.

An embodiment in which the IMS registration is notified by short message is described as below (other transmission manner, such as USSD, may be similar).

Figure 4:
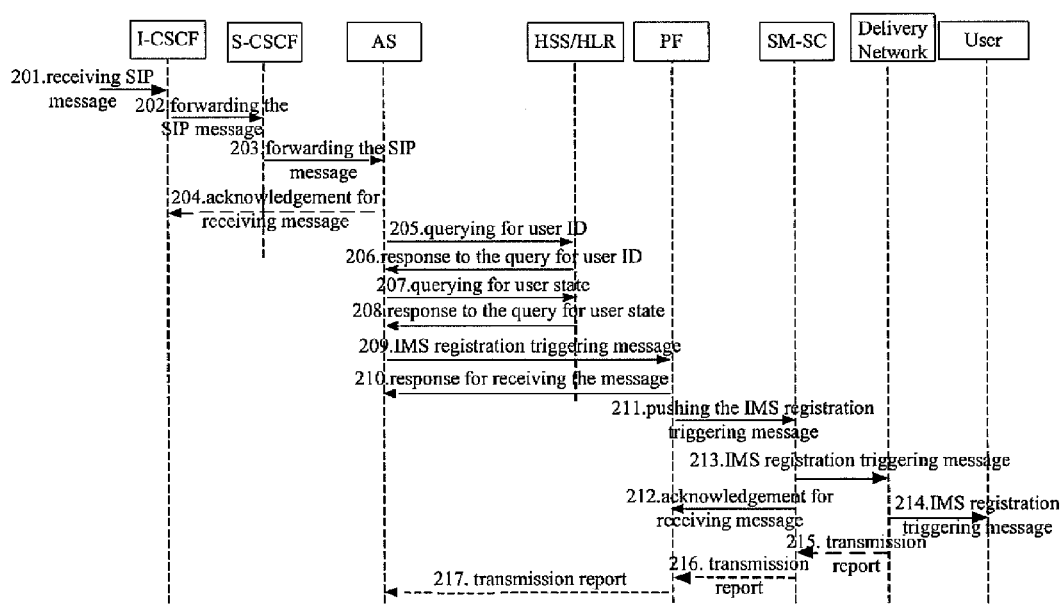
FIG. 4 is a flow chart showing transmitting IMS registration triggering indication message base on a short messaging system according to an embodiment of the present invention.

FIG. 4 is a flow chart showing pushing an IMS registration triggering indication message base on a short messaging system according to an embodiment of the present invention.

In this embodiment, if user A initiates a SIP session to user B, and user B is not registered. The AS determines to notify the user to register by a short message, which is shown as follows:

Steps 201-210 are similar to steps 101-110 as shown in FIG. 3. The AS or PF determines whether to push the IMS registration triggering indication message and selects the transmission mode.

Step 211: as the transmission mode selected by the AS or the PF is transmitting by a short message, the AS pushes the IMS registration trigger indication message to the short message center (i.e. the PF, the PF may be a short message center); and the IMS registration triggering indication message may be a short message in special format as to be distinguished from ordinary short messages.

Step 212: the short message center may return an acknowledgement for receiving the IMS registration triggering indication message.

Steps 213-214: the short message center transmits the short message to the user through the transmission network (i.e. the CS domain or the PS domain).

Steps 214-217: the transmission network optionally returns a transmission report to the AS.

It should be noted that the manner mentioned above for transmitting the IMS registration trigger indication information may be applied in a process in which a non-IMS domain session exists (i.e. a session in the CS domain or the PS domain) or in a process in which no non-IMS session exists.

If the non-IMS session exists, the IMS registration is usually triggered by subsequent demand for IMS message interaction.

For example, if a session in non-IMS domain exists and a subsequent IMS session may exist according to the service logic judgment. As in CSI service, a session in the CS domain may be performed between a user A and a user B. Because the session is a CSI session (for example, in the CS domain, a wireless capability interaction for UUS1 (User-to-user Signaling 1) is to be performed by determination). As the user B detects the session is a CSI session, and if the user B is not registered in the IMS, due to the possibility that the IMS session may exist in the CSI service subsequently, the user B may perform a judgment according to relevant criteria and determines whether to initiate an IMS registration according to result of the judgment.

In one or more embodiments of the present invention, as the user receives the IMS registration triggering indication message, the user performs the judgment according to the IMS registration triggering indication message and relevant criteria. When it is determined that the IMS registration should be performed, the user initiates the IMS registration to the IMS system. The IMS registration triggering indication message may include the service ID for identifying an IMS session to be performed, associated information for performing the IMS session (for example, performing a UUS1 for wireless capability interaction), numbers of the calling user and called user, content to be pushed for the IMS session, or IP address or network address of the content to be pushed for the IMS session. In actual implementation, the user may determine whether IMS interaction is required for the subsequent session in different ways according to the IMS registration triggering indication message. The process is described with an example in condition that a session in CS domain exists and another example in condition that a session in PS domain exists.

If the session in CS domain exists, the process may be performed in one of the following manners:

A) A service ID is carried explicitly or implicitly in the UUS signaling interacting between the calling user and the called user. The service ID indicates that the service is a certain service which an IMS session may exist subsequently. Thus, as the called user receives the service ID and determines that a subsequent IMS session may be performed according to the service ID, the IMS registration may be triggered if the called user is not registered in the IMS and the IMS registration is determined to be performed.

B) The calling user and called user may perform special service process through the UUS signaling to indicate that the IMS session is required to perform as default. For example, in CSI service, the calling user and called user may notify its wireless environment in UUS signaling to each other. Once the called user detects that interaction for wireless environment is required and other conditions in UUS signaling, the called user may determine that the IMS session exists subsequently as default. Therefore, if the called user is not registered in the IMS and determines that the IMS registration is required, the IMS registration may be initiated.

C) Performing a judgment according to the number of the calling user or the called user. If the called user detects that the current session is a session in CS domain and the number of the calling user is a special number, the called user determines the possibility of a subsequent IMS session existing and triggers the IMS registration according to relevant criteria.

If a session in PS domain exists:

A) The user may determine whether the IMS registration is required according to the content to be pushed. For example, the stream media server pushes a page with specific content, and the user may determine that the pushed content belongs to a specific service and thus a subsequent IMS session is required. Therefore, if the user is not registered in the IMS and the user determines that the IMS registration is required to be performed, the IMS registration may be initiated.

B) The user may perform a judgment according to the IP address or network address of the pushed content. If the user determines that the subsequent IMS session exists according to the IP address or network address of the pushed content, then the user determines whether to initiate the IMS registration according to relevant criteria.

It should be noted that the manner of triggering from network side can be used in conjunction with the manner of triggering from calling user side. For example, the calling user may use the manner of triggering from calling user side first, as the UUS1 signaling is not transmitted reliably and may be lost, the manner of triggering from the network side may be used subsequently.

While the present invention has been illustrated and described with reference to some preferred embodiments, the present invention is not limited to these. Those skilled in the art should recognize that various variations and modifications may be made without departing from the spirit and scope of the present invention as defined by the accompanying claims.

What is claimed is:

1. A method for triggering IMS (IP Multimedia Subsystem) registration in IMS, comprising: receiving, by a first user equipment, an IMS registration triggering indication message from a network side or a second user equipment, wherein the IMS registration triggering indication message comprises wireless environment information of the second user equipment; based on the wireless environment information of the second user equipment, determining, by the first user equipment, that the wireless environment information of the second user equipment supports simultaneous CS (circuit switching) and PS (packet switching) services; based on the determining that wireless environment information of the second user equipment supports simultaneous CS and PS services, determining, by the first user equipment, to initiate the IMS registration to the IMS and triggering the first user equipment to initiate the IMS registration to the IMS; wherein the IMS registration triggering indication message is sent to the first user equipment by interacting signaling between the second user equipment and the first user equipment.

2. The method according to claim 1, wherein, the method further comprises:
    as receiving the IMS triggering indication message, determining, by the first user equipment, whether to return an acknowledgement message to the AS;
    if the first user equipment is determined to return the acknowledgement message to the AS, sending the acknowledgement message to the AS.

3. The method according to claim 1, wherein, the signaling is a User-to-User Signaling.

4. A method for triggering IMS (IP Multimedia Subsystem) registration in IMS, comprising: receiving, by first user equipment, an IMS registration triggering indication message from a network side or a second user equipment, wherein the IMS registration triggering indication message comprises wireless environment information of the user who initiates the triggering; based on the wireless environment information of the second user equipment, determining, by the first user equipment, that the wireless environment information of the second user equipment supports simultaneous CS (circuit switching) and PS (packet switching) services; based on the determining that wireless environment information of the second user equipment supports simultaneous CS and PS services, determining, by the first user equipment, to initiate the IMS registration to the IMS and triggering the first user equipment to initiate the IMS registration to the IMS; wherein, pushing, by a PF (Push Function) entity, the IMS registration triggering indication message to the first user equipment in a selected transmission mode.

5. The method according to claim 4, wherein, the transmission mode is determined by the PF or an AS (Application Server) according to at least one of associated real-time state information, a user policy and a network policy.

6. The method according to claim 4, when the first user equipment subscribes for an unregistered IMS service on the network side, further comprises:
    triggering, to an AS (Application Server) by the network side, if the network side detects a called IMS service for the first user equipment according to subscription data of the unregistered IMS service when the first user equipment is not registered in the IMS; and
    determining, by the AS, whether to trigger the first user equipment to register in the IMS, and, if the AS is determined to trigger the first user equipment to register in the IMS, sending the IMS registration triggering indication message to the PF entity.

7. The method according to claim 6, further comprises:
    obtaining, by the AS, the non-IMS user ID of the first user equipment from an NE (network element) entity that stores a public user ID correlation between an IMS domain and a non-IMS domain, and
    sending an obtained non-IMS user ID and the registration triggering indication message to the PF entity.

8. The method according to claim 7, wherein, if a plurality of non-IMS user IDs of the user are obtained, selecting, by the AS, a public user ID in a domain determined to be pushed from the non-IMS user IDs as the public user ID in the domain to be pushed for the first user equipment.

9. A system for triggering IMS (IP Multimedia Subsystem) registration in IMS, comprising: a receiving unit, adapted to receive an IMS registration triggering indication message from a network side or a second user equipment, wherein the IMS registration triggering indication message comprises wireless environment information of the second user equipment; determining unit, adapted to determine that the wireless environment information of the second user equipment supports simultaneous CS (circuit switching) and PS (packet switching) services based on the wireless environment information of the second user equipment, and determine to initiate the IMS registration to the IMS based on the determining that wireless environment information of the second user equipment supports simultaneous CS and PS services according to the wireless environment information of the second user equipment; and a triggering unit, adapted to trigger a first user equipment to initiate the IMS registration to the IMS; wherein the IMS registration triggering indication message is sent to the first user equipment by interacting signaling between the second user equipment and the first user equipment.

10. The system according to claim 9, wherein, when the first user equipment is subscribed for an unregistered IMS service on the network side, the network side triggers an AS (Application Server) if the network side detects a called IMS service for the first user equipment according to subscription data of the unregistered IMS service when the first user equipment is not registered in the IMS; and
    the AS determines whether to trigger the first user equipment to register in the IMS, and, if the AS is determined to trigger the first user equipment to register in the IMS, the AS sends the IMS registration triggering indication message to the PF entity.

11. The system according to claim 9, wherein, the AS obtains the non-IMS user ID of the first user equipment from an NE (network element) entity that stores a public user ID correlation between an IMS domain and a non-IMS domain, and
    sends an obtained non-IMS user ID and the registration triggering indication message to the PF entity.

12. The system according to claim 9, wherein, as receiving the IMS triggering indication message, the first user equipment determines whether to return an acknowledgement message to the AS; and
    sends the acknowledgement message to the AS if the first user equipment is determined to return the acknowledgement message to the AS.

13. A system for triggering IMS (IP Multimedia Subsystem) registration in IMS, comprising: a receiving unit, adapted to receive an IMS registration triggering indication message from a network side or a second user equipment, wherein the IMS registration triggering indication message comprises wireless environment information of the second user equipment; determining unit, adapted to determine that the wireless environment information of the second user equipment supports simultaneous CS (circuit switching) and PS (packet switching) services based on the wireless environment information of the second user equipment, and determine to initiate the IMS registration to the IMS based on the determining that wireless environment information of the second user equipment supports simultaneous CS and PS services according to the wireless environment information of the second user equipment; and a triggering unit, adapted to trigger a first user equipment to initiate the IMS registration to the IMS wherein, a PF (Push Function) entity pushes the IMS registration triggering indication message to the first user equipment in a selected transmission mode.

\* \* \* \* \*

UNITED STATES PATENT AND TRADEMARK OFFICE
CERTIFICATE OF CORRECTION

PATENT NO. : 8,666,402 B2  Page 1 of 1
APPLICATION NO. : 11/938926
DATED : March 4, 2014
INVENTOR(S) : Fenqin Zhu It is certified that error appears in the above-identified patent and that said Letters Patent is hereby corrected as shown below:

On Title Page, Item (75) Inventor, Delete "Guangdong (CN)" and insert --Shenzhen (CN)--.

Signed and Sealed this
Thirteenth Day of May, 2014

Michelle K. Lee
*Deputy Director of the United States Patent and Trademark Office*